United States Patent Office 3,342,872
Patented Sept. 19, 1967

3,342,872
2,2-BIS-(4,4-DITERTIARY-BUTYL-PEROXY-CYCLOHEXYL)-PROPANE
Hans G. Gerritsen and Leonardus W. J. Damen, Deventer, Netherlands, assignors to Koninklijke Industrieele Maatschappij Noury & van der Lande N.V., Deventer, Netherlands, a corporation of the Netherlands
No Drawing. Filed May 11, 1964, Ser. No. 366,639
Claims priority, application Netherlands, May 14, 1963, 292,756
1 Claim. (Cl. 260—610)

This invention relates to a new organic peroxide which has been found to be suitable for the cross-linking of natural and synthetic rubbers, to a process for the preparation of this peroxide, and to a process for cross-linking natural and synthetic rubbers with the aid of this peroxide.

In the cross-linking of natural rubbers and synthetic rubbers, such as copolymers of ethylene and monomers containing vinyl ($CH_2$=CH—) groups, silicone rubbers and polyurethane rubbers, use is often made of peroxidic cross-linking agents, such as dicumyl peroxide and tert. butylcumyl peroxide. However, the peroxide most suited to the purpose, namely dicumyl peroxide, has the disadvantage that the finished products obtained by using it possess a very disagreeable odor. Consequently, rubbers cross-linked with the aid of dicumyl peroxide cannot be used in many environments where they would otherwise be desirable.

It has, surprisingly, been found that the hitherto unknown compound 2,2-bis-(4,4-ditert.-butyl-peroxy-cyclohexyl)-propane, when used as an agent for the cross-linking of synthetic and natural rubbers, is almost equal in effectiveness to dicumyl peroxide and, moreover, has the additional advantages that cross-linked products prepared with its aid do not possess a disagreeable odor and that the cross-linking may take place, if desired, at lower temperatures than hitherto employed.

One aspect of the present invention consists, therefore, in the provision of a new peroxide, namely, 2,2-bis-(4,4-ditert.-butyl-peroxy-cyclohexyl)-propane.

According to another aspect of the present invention, the aforesaid peroxide is obtained by reacting 2,2-bis-(4-ketocyclohexyl)-propane with tert.-butyl hydroperoxide in the presence of an acid-reacting catalyst, and eliminating from the reaction zone the water formed during the reaction.

Preferably, the reaction is carried out at a temperature from 0° to 50° C. Sulphuric acid is the preferred catalyst.

In one preferred embodiment of the present invention, water formed during the reaction is eliminated by azeotropic distillation under reduced pressure.

In accordance with another preferred feature of the present invention, the reaction is carried out in an organic solvent, e.g., benzene.

According to still another aspect of the present invention, a new and useful process for the peroxidic cross-linking of a natural or synthetic rubber involves the use of 2,2-bis-(ditert.-butyl-peroxy-cyclohexyl)-propane as the peroxidic cross-linking agent, and the resulting cross-linked products.

The cross-linking with the aid of the new peroxidic agent according to the present invention may take place in the usual apparatus under normal conditions of temperature and pressure, and if desired in the presence of one or more auxiliary agents, such as carbon black, triallyl cyanurate, triallyl phosphate, sulphur or sulphur-releasing compounds such as tetramethylthiuramdisulphide, and accelerators such as diphenylguanidine.

In order that the present invention may be still more readily understood, the following specific example is given by way of illustration only and not by way of limitation.

Where reference is made hereinafter to "compression," this was determined with the aid of a Williams plastimeter in the manner described in "S.P.E. Journal," 17 (1961), 265–270, with the proviso that instead of a weight of 10 kg. a weight of 5 kg. was used.

Example

A mixture of 118 g. (0.5 mol) of 2,2-bis-(4-ketocyclohexyl)-propane, 281 g. (3 mols) of tert.-butyl hydroperoxide and 0.8 ml. of 70% w./w. $H_2SO_4$ in 600 ml. of benzene was heated at a temperature of 40° C. The water formed during the reaction was eliminated by azeotropic distillation with benzene under reduced pressure. The benzene was recycled to the reaction mixture during the separation of the water. This process was continued for 2 hours at a final pot temperature of not more than 40° C.

Subsequently, the reaction mixture was freed from acid by treatment with 100 ml. of 5% sodium bicarbonate solution and thereafter twice with 250 ml. of water. In order to eliminate the volatile constituents, the mixture was then concentrated by evaporation in vacuo at a temperature of 40° C. 280 g. of raw peroxide were thus obtained. This product was added to a mixture of 420 ml. of ether and 980 ml. of ethanol and the resulting mixture was allowed to crystallize by cooling to 0° C.

After filtration, 228 g. of white crystalline 2,2-bis-(4,4-ditert.-butyl-peroxy-cyclohexyl)-propane were obtained, representing a yield of 81% calculated on the 2,2-bis-(4-ketocyclohexyl)-propane.

Active oxygen content: 11.30%; (theor: 11.43%). C: found 66.21%; calc: 66.43%; H: found 10.38%; calc: 10.71%.

Mixtures containing the parts by weight mentioned in the following table were made on a mixing roll, at a temperature of 80°–90° C. for mixtures A to K, inclusive, and 20° C. for mixtures L to P, inclusive. These mixtures were cross-linked in a press for 40 minutes, at a temperature of 165° C. for mixtures A to D and G to K inclusive and of 140° C. for mixtures E and F and L to P, inclusive. After 30 minutes at a temperature of 120° C., the compression of samples from the sheets thus obtained was determined in a plastimeter.

The results obtained are given below in tabular form:

| | A | B | C | D | E | F | G | H | I | K | L | M | N | O | P |
|---|---|---|---|---|---|---|---|---|---|---|---|---|---|---|---|
| Copolymer of ethylene and propylene (50% by weight of ethylene) | 100 | 100 | 100 | 100 | 100 | 100 | | | | | | | | | |
| Copolymer of ethylene and vinylacetate (55% by weight of ethylene) | | | | | | | 100 | 100 | 100 | 100 | | | | | |
| Silicone rubber | | | | | | | | | | | 100 | 100 | 100 | 100 | 100 |
| HAF carbonblack | 50 | 50 | 50 | 50 | 50 | 50 | 50 | 50 | 50 | 50 | | | | | |
| Aerosil | | | | | | | | | | | 65 | 65 | 65 | 65 | 65 |
| Sulphur | 0.32 | 0.64 | 0.32 | | 0.32 | 0.32 | | | | | 35 | 35 | 35 | 35 | 35 |
| Triallylcyanurate | | | | | | | 2 | 2 | 2 | | | | | | |
| Dicumylperoxide | | | 2.7 | | | 2.7 | | | 2.7 | | | | 1.35 | 2.7 | |
| 2,2-bis-(4,4-di-tert.-butylperoxycyclohexyl)-propane | 1.4 | 2.8 | | | 1.4 | -- | 1.4 | 2.8 | | | 0.7 | 1.4 | | | |
| Temperature of mixing roll, °C | 80–90 | 80–90 | 80–90 | 80–90 | 80–90 | 80–90 | 80–90 | 80–90 | 80–90 | 80–90 | 20 | 20 | 20 | 20 | 20 |
| Temperature at cross-linking, °C | 165 | 165 | 165 | 165 | 140 | 140 | 165 | 165 | 165 | 165 | 140 | 140 | 140 | 140 | 140 |
| Compression after 40 min. of cross-linking, in percent | 4 | 3 | 3 | 49 | 5 | 6 | 6 | 5 | 5 | 52 | 2 | 2 | 2 | 2 | 46 |

The sheets made with the aid of 2,2-bis-(4,4-ditertiary-butyl-peroxy-cyclohexyl)-propane did not possess a disagreeable odor, in contradistinction to those made with dicumyl peroxide.

It appears from the cross-linking experiments of the copolymer of ethylene and propylene at a temperature of 165° C. and 140° C. that, in cross-linking with 2,2-bis-(4,4-ditertiarybutyl-peroxy-cyclohexyl)-propane at a temperature of 140° C., its efficiency decreased to a smaller extent than the efficiency of dicumyl peroxide.

While specific examples of preferred methods embodying the present invention have been described above, it will be apparent that many changes and modifications may be made in the details of the methods of procedure without departing from the true spirit of the invention. It will therefore be understood that the particular methods set forth above are intended to be illustrative only, and are not intended to limit the scope of the invention which is defined by the following claim.

What is claimed is:

2,2 - bis - (4,4 - ditertiary - butyl - peroxy - cyclohexyl)-propane.

References Cited

UNITED STATES PATENTS

| | | | |
|---|---|---|---|
| 2,813,127 | 11/1957 | White | 260—610 |
| 2,954,406 | 9/1960 | Brill | 260—610 |
| 3,029,230 | 4/1962 | Strauss | 260—87.3 |
| 3,126,364 | 3/1964 | Ilnyckj | 260—87.3 |

FOREIGN PATENTS

| | | |
|---|---|---|
| 896,813 | 2/1962 | Great Britain. |

OTHER REFERENCES

Dickey et al.: "J. Amer. Chem. Soc.," vol. 71, pp. 1432–34 (1949).

Tobolsky et al.: "Organic Peroxides" (1954), p. 51.

LEON ZITVER, *Primary Examiner.*

JOSEPH L. SCHOFER, *Examiner.*

W. B. LONE, J. F. McNALLY, *Assistant Examiners.*